US012670756B2

(12) United States Patent
Rihl et al.

(10) Patent No.: US 12,670,756 B2
(45) Date of Patent: Jun. 30, 2026

(54) ACCESS CONTROL DEVICE FOR PERSONS AND/OR VEHICLES AND METHOD FOR CONTROLLING ACCESS FOR PERSONS AND/OR VEHICLES

(71) Applicant: SkiData GmbH, Salzburg (AT)

(72) Inventors: Marco Rihl, Salzburg (AT); Cornelius Kirchner, Salzburg (AT)

(73) Assignee: SKIDATA GMBH, Salzburg (AT)

( * ) Notice: Subject to any disclaimer, the term of this patent is extended or adjusted under 35 U.S.C. 154(b) by 60 days.

(21) Appl. No.: 18/712,481

(22) PCT Filed: Nov. 23, 2022

(86) PCT No.: PCT/EP2022/083003

§ 371 (c)(1),
(2) Date: May 22, 2024

(87) PCT Pub. No.: WO2023/094460

PCT Pub. Date: Jun. 1, 2023

(65) Prior Publication Data

US 2024/0420532 A1 Dec. 19, 2024

(30) Foreign Application Priority Data

Nov. 25, 2021 (EP) .................................... 21210555

(51) Int. Cl.
*G07C 9/10* (2020.01)

(52) U.S. Cl.
CPC .................................... *G07C 9/10* (2020.01)

(58) Field of Classification Search
CPC ... G07C 9/10; G07C 9/25; G07C 9/00; G08B 13/196; H04W 4/02

(Continued)

(56) References Cited

U.S. PATENT DOCUMENTS 7,984,590 B2 * 7/2011 Hoshide .................. E05F 15/73 49/31
9,255,437 B2 * 2/2016 Kershner .............. F24C 15/023

(Continued)

FOREIGN PATENT DOCUMENTS

WO 2020/240602 A1 12/2020

OTHER PUBLICATIONS

European Extended Search Report, EP Application No. 21210555.5 dated May 16, 2022; 7 pages.

*Primary Examiner* — Nam V Nguyen
(74) *Attorney, Agent, or Firm* — POLSINELLI LLP

(57) ABSTRACT

The invention refers to an access control device (1) for a person and/or a vehicle, comprising a first blocking element (2) and a second blocking element (3), the first blocking element (2) and the second blocking element (3) being positioned adjacent to each other for defining a common access, an interface device configured to generate an opening signal upon receiving an access request, and a control device (7) configured to control the first blocking element (2) and the second blocking element (3) in response to the opening signal from the interface device, the control device (7) being configured to generate a first signal for enabling access controlled by the first blocking element (2), a second signal for enabling access controlled by the second blocking element (3), and a third signal for simultaneously enabling access controlled by the first blocking element (2) and the second blocking element (3).

20 Claims, 2 Drawing Sheets

Figure 1:
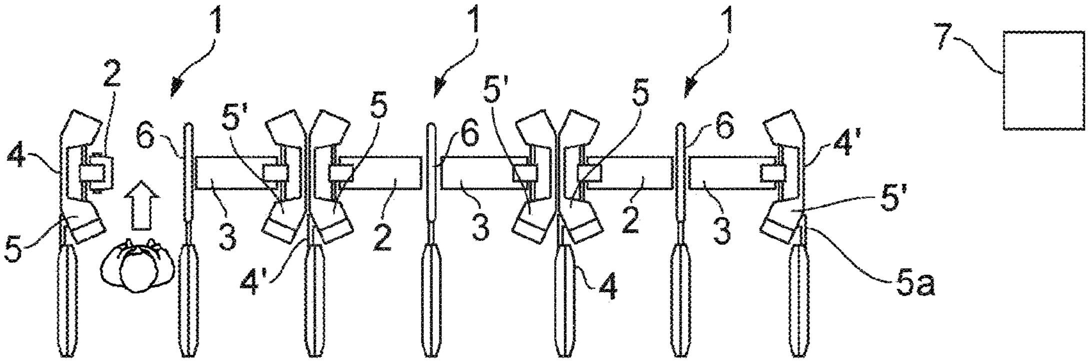

(58) Field of Classification Search
USPC .......................................... 340/5.7, 5.71, 5.72
See application file for complete search history.

(56) References Cited

U.S. PATENT DOCUMENTS

| | | | | |
|---|---|---|---|---|
| 9,865,144 | B2 * | 1/2018 | Trani | G08B 13/19695 |
| 2017/0243415 | A1 * | 8/2017 | Huff | H04N 7/183 |
| 2017/0256107 | A1 * | 9/2017 | Trani | G07C 9/00309 |

* cited by examiner

ACCESS CONTROL DEVICE FOR PERSONS AND/OR VEHICLES AND METHOD FOR CONTROLLING ACCESS FOR PERSONS AND/OR VEHICLES

CROSS-REFERENCES TO RELATED APPLICATIONS

This application is a U.S. National Stage of PCT Application No. PCT/EP2022/083003, filed Nov. 23, 2022, which claims the priority benefit of European Patent Application No. 21210555.5 filed on Nov. 25, 2021, both of which are incorporated herein by reference in their entirety for all purposes.

The present invention relates to an access control device for persons and/or vehicles including a first blocking element and a second blocking element. Furthermore, the invention relates to a method for controlling access for persons and/or vehicles using a first blocking element and a second blocking element.

Access control devices for persons are known from the prior art. They can comprise means for the detection and evaluation of access authorisations as well as mechanical blocking elements, for example in the form of turnstiles, turnstiles with one, two or three blocking arms, sliding doors, lifting-sliding doors or so-called flap gates, whereby the blocking elements are actuated in the presence of a valid access authorisation. Furthermore, access control devices for vehicles are known which have blocking elements which are actuated in the presence of a valid access authorization.

The present invention is based on the objective of providing an access control device and method for operating an access control device for persons and/or vehicles having a variable width of the access.

This objective is solved by the subject matter of the independent claims. Optional embodiments are described in the depending claims.

An access control device for a person and/or a vehicle is provided which comprises a first blocking element and a second blocking element. The first blocking element and the second blocking element are positioned adjacent to each other for defining a common access. The access control device further comprises an interface device configured to generate an opening signal upon receiving an access request (e.g. by the person and/or the vehicle), and a control device configured to control the first blocking element and/or the second blocking element in response to the opening signal received from the interface device. The control device is configured to generate a first signal for enabling access controlled by the first blocking element, a second signal for enabling access controlled by the second blocking element, and a third signal for simultaneously enabling access controlled by the first blocking element and the second blocking element.

Further, a method for controlling access for a person and/or a vehicle is provided which comprises step a) of generating, by an interface device, an opening signal upon receiving an access request by the person and/or a vehicle, and step b) of controlling a first blocking element and/or a second blocking element in response to receiving the opening signal from the interface device. The first blocking element and the second blocking element are positioned adjacent to each other for defining a common access. Step b) includes generating a first signal for enabling access controlled by the first blocking element, a second signal for enabling access controlled by the second blocking element, and a third signal for simultaneously enabling access controlled by the first blocking element and the second blocking element.

According to the invention, the blocking elements of the access control device can be controlled jointly (by generating the third signal) or separately (by generating the first or second signals). The control device generates the first to third signals on the basis of the evaluation of access requests which can be read out by means of the interface device. In an autonomous or separated operation, a part of the common access is blocked as a partial access by the first or the second blocking element.

The invention advantageously provides a splitting of the common access into two independent partial accesses which are each controlled by the first and second blocking elements, respectively.

The first blocking element and/or the second blocking element can be configured to be moved between an open position and a closed position. In the closed position, the first blocking element and the second blocking element may each block a part of the common access. In this embodiment, the first blocking element and the second blocking element can comprise movable doors, gates, and/or flaps.

The first blocking element and/or the second blocking element can also be configured to be arranged in the respective partial access in the open position. However, in this embodiment, the first blocking element and the second blocking element are movable (not locked) such that the person and/or vehicle can push/move the first blocking element and the second blocking element in order to get access. In this embodiment, the first blocking element and the second blocking element can comprise turnstiles. In other words, the open position does not only refer to an embodiment in which the first blocking element and/or the second blocking element are not positioned in the area of the common access, but the open position defines a state of the first blocking element and the second blocking element in which the blocking elements grant access, i.e. a person and/or vehicle can pass the first blocking element and the second blocking element.

The first blocking element and the second blocking element can define a first access and second access, respectively. The first access may be blocked by the first blocking element in the closed position and the second access may be blocked by the second blocking element in the closed position. The first blocking element can allow passage through the first access in the open position of the first blocking element. The second blocking element can allow passage through the second access in the open position of the second blocking element.

The first access and the second access commonly define the common access. The common access is a continuous access, for example the first access and the second access are not separated by further (permanent) mechanical means. Thus, if the first blocking element and the second blocking element are in the open position, passage through the common access is possible. Thereby, the person and/or the vehicle can use the width of the sum of the widths of the first access and the second access. In other words, the common access can have a width that is the sum of a width of the first access and of a width of the second access, wherein optionally the width of the first access and the width of the second access are not separated and, thus, are directly adjacent to each other.

The width of the common access may define the maximal width of the person and/or vehicle that can move through the access control device. The sum of the widths of the first blocking element and the second blocking element can define the width of the common access and, thus, the define the maximal width of the person and/or vehicle that can move through the access control device. The maximal width of the person and/or vehicle that can move through first access and the second access can be defined by the width of the first blocking element and the second blocking element, respectively.

The common access is defined by the first blocking element and the second blocking element. The common access is open when passage of the person and/or vehicle through the common access is possible. In other words, the common access is open if the first blocking element and the second blocking element are in the open position (i.e. if the first blocking element and the second blocking element allow access).

The first blocking element and the second blocking element may comprise a first supporting device and a second supporting device, respectively. The first supporting device can support, allow movement of, and/or move the first blocking element from the open position to the closed position. The second supporting device can support, allow movement of, and/or move the second blocking element from the open position to the closed position. The common access may be provided between the first supporting device and the second supporting device.

The first supporting device and/or the second supporting device may include an actuator, such as an electric motor, for moving the first blocking element and the second blocking element, respectively. Alternatively or additionally, the first supporting device and/or the second supporting device may comprise locking means for locking and unlocking the first blocking element and the second blocking element, respectively. In an unlocked state or open position, the first blocking element and/or the second blocking element can be moved (e.g. from the closed position to the open position) by the person and/or the vehicle. In a locked state, the first blocking element and/or the second blocking element cannot be moved (e.g. from the closed position to the open position) by the person and/or the vehicle. The locking means mechanically controls access to the first access, the second access, and/or the common access is denied.

The interface device is provided for recognising, obtaining, and/or detecting access requests by the person and/or the vehicle. The access requests may be executed by inputting information into the interface device, paying an access fee, presenting a ticket, and/or presenting other types of access means which can be recognised/detected by the interface device. Upon recognition of an access request, the interface device generate an opening signal that is transmitted/forwarded to the control device. The opening signal may comprise any type of data that allows the determination that a particular access request is submitted to the interface device.

The control device may comprise one or more processors, one or more memories, and/or other types of computing means which allow the processing of the opening signal and the generation of the first to third signals. The first to third signal may comprise any type of data that can be read by the first blocking element, the second blocking element, the first supporting device, and/or the second supporting device and/or can trigger an operation of the first blocking element, the second blocking element, the first supporting device, and/or the second supporting device. The control device may be electrically and/or electronically connected to the first blocking element, the second blocking element, the first supporting device, and/or the second supporting device, optionally to the actuator and/or the locking means. Thus, the first to third signals change the state of the first blocking element and/or the second blocking element.

The control device may be a computer or server remote from the first blocking element, the second blocking element and/or the interface device. The control device may store an algorithm, table and/or function that links the opening signal to the generation of a respective one of the first to third signals.

In an optional embodiment, the interface device includes a first reading device coupled to the first blocking element and a second reading device coupled to the second blocking element, wherein optionally the control device generates the first signal upon receiving a first opening signal from the first reading device and/or the second signal upon receiving a second opening signal from the second reading device.

In a further optional embodiment, the method further comprises the step of generating the first signal upon receiving a first opening signal from a first reading device coupled to the first blocking element and/or the second signal upon receiving a second opening signal from a second reading device coupled to the second blocking element.

The first reading device and/or the second reading device may include a scanner for scanning a ticket, an input device for inputting an access request (such as a touchscreen, buttons, a keyboard), a payment device for accepting cash and/or card payment, and/or an antenna for detecting a token granting access. The first reading device and/or the second reading device may include reading devices for contactless reading of access authorizations, for example via a standard for wireless communication, such as RFID, NFC, WLAN, Bluetooth, BLE, UWB, and/or devices capturing biometric features, such as fingerprint scanners or cameras with facial recognition software.

The first reading device and/or the second reading device may electrically and/or electronically connected to the control device. The first reading device and/or the second reading device may be configured to generate the first opening signal and the second opening signal, respectively, upon detecting/receiving an access request, for example by means of presenting a ticket, paying the access fee, and/or presenting the access authorizations described above.

The first opening signal may be generated upon receiving an access request for the first partial access (i.e. access controlled by the first blocking element). The second opening signal may be generated upon receiving an access request for the second partial access (i.e. access controlled by the second blocking element).

The reception of the first opening signal triggers the control device to generate the first signal and the reception of the second opening signal triggers the control device to generate the second signal. Thus, in this embodiment, the presentation of an access request to the first reading device results in access to the first access and the presentation of an access request to the second reading device results in access to the second access. This means the first blocking element and the second blocking element are controlled separately depending on an access request that is separately presented to the first reading device and the second reading device, respectively. This can be called autonomous operation in which it is possible to assign at least one reading device unambiguously to each blocking element.

Thereby, the access request stored on the ticket and/or on other types of tokens for access authorizations may include information that are detected/read/recognised by the first and/or second reading devices which result in the generation of the first and second opening signal, respectively. Thus, the respective opening of the first blocking element and the second blocking element essentially depends on the information that is read out by the first and second reading devices.

In an optional embodiment, the control device generates the third signal upon receipt of a third opening signal from the first reading device and/or the second reading device.

In a further optional embodiment, the third signal is generated upon receipt of a third opening signal from the first reading device and/or the second signal.

The above considerations and embodiments for detecting/reading/recognising the first and second opening signals equally applied to the third opening signal. However, the information stored on the ticket and/or on other types of tokens for access authorizations result in the generation of the third opening signal. Thus, the simultaneous opening of the first blocking element and the second blocking element (the common access) essentially depends on the information that is read out by the first and/or second reading devices. This may be called joint operation in which at least one reading device is assigned to both blocking elements.

In an optional embodiment, the control device includes a memory and generates the third signal upon receipt of the first opening signal and/or the second opening signal if information is stored in the memory which links the receipt of the first opening signal and/or the second opening signal to the generation of the third signal. Alternatively or additionally, the access control device further comprises a sensor device configured to generate sensor data indicative of a width of the person and/or vehicle, the control device being configured to determine, based on the sensor data, whether the person and/or the vehicle requires access to the common access, the control device further configured to generate the third signal upon receipt of the first opening signal and/or the second opening signal if it is determined that access to the common access is required.

In a further optional embodiment, step b) includes generating the third signal upon receipt of the first opening signal and/or the second opening signal if information is stored in a memory which links the receipt of the first opening signal and/or the second opening signal to the generation of the third signal. Alternatively or additionally, step b) includes generating sensor date indicative of a width of the person and/or vehicle using a sensor device, determining, based on the sensor data, whether the person and/or the vehicle requires enabling access to the common access, and generating the third signal upon receipt of the first opening signal and/or the second opening signal if it is determined that access to the common access is required.

The sensor device may include one or more sensors which can measure, image, monitor, and/or detect the person and/or vehicle that requests access. The one or more sensors generate sensor data which can be analysed, processed, and/or examined in order to the determine the width of the person and/or vehicle. This analysis, processing, and/or examination may be executed by the control device. Thus, the sensor device and/or the one or more sensors may be electronically connected to the control device.

The control device may include an optical sensor, an acoustic sensor, and/or a sensor detecting electrical and/or magnetic fields or changes thereof. For example, the control device may include a camera, a metal detector, light barriers, and/or a sonar system. The control device may be arranged on the first and/or second supporting device, below the common access, and/or above the common access.

The camera may be positioned for imaging the interface device, the first blocking element, the second blocking element, and/or an area surrounding the interface device, the first blocking element, and/or the second blocking element. The camera may be configured to capture a video (a stream of images) and/or single images, for example in response to receiving the access request. The camera may be attached to the first supporting device and/or the second supporting device. The camera can be electronically and/or electrically connected to the control device which includes an algorithm, an artificial intelligence (AI), or other means for determining the width of the person and/or the vehicle.

The metal detector may be arranged in the ground such as below the access control device. The metal detector may include several sensors which each detect the presence of a metallic body in its vicinity. The control device may receive sensor data from each of the sensors indicating the presence of a metallic body. This may enable the control device to determine the (approximate) width of a metallic vehicle. For example, this may enable a discrimination between a car and a bicycle.

The light barrier may include a plurality of optical light sources (e.g. IR light sources such a as LEDs) and a plurality of optical sensors configured to detect the light generated by the optical light sources. Optionally each optical sensor is configured to detect the light emitted by a single light source. The control device may receive sensor data from each of the optical sensors indicating the presence of a person and/or vehicle between the light source and the light source and the optical sensor. This may enable the control device to determine the (approximate) width of the person and/or vehicle.

The sonar system may include one or more acoustic sources (e.g. generating ultrasound) and one or more acoustic sensors that are configured to detect the sound generated by the one or more acoustic sources and reflected by the person and/or vehicle. The control device may receive sensor data from the one or more acoustic sensors indicating the presence of a person and/or vehicle. This may enable the control device to determine the (approximate) width of the person and/or vehicle.

The control device may be further configured to compare the determined width of the person and/or the vehicle with a width of the first blocking element and the second blocking element. If the control device determines that the width of the person and/or the vehicle is greater than width of the first blocking element and the second blocking element, the control device may be configured to generate the third signal which results in the opening of the first blocking element and the second blocking element (common access). This allows passage through the control device which would not be possible due to the width of the person and/or vehicle in relation to the width of the first blocking element and the second blocking. In other words, the third signal is automatically generated if it is determined using the sensor device that opening/unlocking the first blocking element or the second blocking element is not sufficient and access to the common access is required.

Another automatic mode relates to the generation of the third signal if information is stored in a memory of the control device that links the receipt of the first opening signal and/or second opening signal to the generation of the third signal. For example, it is stored in the memory for certain persons and/or vehicle that they require access to the common access. Alternatively, the link between the third signal and the first and/or second opening signal may depend on the time of the access request or other parameters that can be stored in the memory. For example, during summer when bicycles or other vehicles are expected, the control device is set to generate the third signal when receiving the first and/or second opening signal. The same control device may not generate the third signal when receiving the first and/or second opening signal during winter when skiers are expected who do not require common access.

In this embodiment, the ticket or token for access authorizations does not include information triggering the generation of the third signal. Instead, the generation of the third signal is started based on the information that is stored within the memory, i.e. independent from the access request.

The blocking elements, which may for example be in the form of flaps or single or multi-armed turnstiles, may be of the same dimensions such that the partial accesses defined by the independent control of the blocking elements have the same width; alternatively, it may be provided that the blocking elements are of different dimensions. For example, in an access control device for vehicles, the width of the first access may be sufficient for a passenger car, with the width of the second partial access being sufficient for a motorcycle, and with the common access width being sufficient for a truck.

In an optional embodiment, the access control device further comprises a centre device movable between a retraced position and a protruding position, wherein, in the protruding position, the centre element is arranged between the first blocking element and the second blocking element, and wherein, in the retracted position, the centre element is positioned such that the centre element does not interfere with the common access.

In a further optional embodiment, the method further comprises moving a centre device between a retraced position and a protruding position, wherein, in the protruding position, the centre element is arranged between the first blocking element and the second blocking element, and wherein, in the retracted position, the centre element is positioned such that the centre element does not interfere with the common access.

The centre device can be moved automatically and can be actuated via an actuator. The centre device may be configured as an extendable bollard. If an automatically movable centre device is provided, this is lowered in joint operation before the blocking elements are actuated when granting common access (i.e. the third signal is generated). The centre device may remain in the protruding position if the first access and/or the second access is granted (i.e, the first and/or second signals are generated).

In the retracted position, the centre device may be completely inserted in a cavity and/or the centre device does not protrude into the common access. In the protruding position, the centre device may be arranged between or in the middle of the first supporting device and a second supporting device. The centre device in the protruding position may divide the common access into the first access and the second access.

In an optional embodiment, the centre device is received in a cavity below the common access in the retracted position, and/or the interface device includes a third reading device that is arranged on the centre device.

The cavity may be arranged within the ground under the common access. The centre device (linearly) moves out of the ground when moving from the retracted position to the protruding position. However, the centre device is not limited thereto. The centre device can move along a rotational path when moving from retracted position to the protruding position and/or vice versa. The centre device may be moveable attached on a supporting structure such as a beam extending above the common access area. The supporting structure may be attached to the first supporting device and/or the second supporting device.

In an optional embodiment, the first blocking element and/or the second blocking element include a flap and/or a turnstile, optionally including two or three arms.

The first blocking element and/or the second blocking element may comprise mechanical blocking elements, for example in the form of turnstiles, turnstiles with one, two or three blocking arms, sliding doors, lifting-sliding doors or so-called flap gates, whereby the blocking elements are actuated the presence of a valid access authorisation.

In an optional embodiment, the interface device includes means for contactless recognition of a ticket and/or means for biometric recognition.

In a further optional embodiment, step a) includes contactless recognition of a ticket and/or biometric recognition.

The biometric recognition may be executed by the camera described above. Alternatively or additionally, the interface device includes one or more further cameras which may be attached to the first supporting device and/or the second supporting device. The biometric recognition may be provided by a fingerprint scanner or iris scanner. The means for contactless recognition may include a scanner and/or antenna for detecting and reading the ticket or other tokens providing access authorization.

According to an optional embodiment, it is provided that, in joint operation, both blocking elements can be opened fully or partially. In the case of a partial opening of both blocking elements, a partial access for a person and/or a vehicle can be granted between the ends of the blocking elements, whereas in the case of a complete opening of the blocking elements, the common access width is available.

According to an optional embodiment, the selection of the operating modes, namely joint mode, autonomous mode, and/or the selection of a complete or partial actuation of the blocking elements in the common operation is made automatically on the basis of the opening signal generated on the basis of the detection of the required access width, i.e. whether the common access or a partial access is required.

Here, the information as to whether common access or partial access is required may be stored in the ticket or other tokens providing access authorization and read out. Alternatively or additionally, the required access width may be detected by means of the evaluation of the sensor data of at least one sensor and/or the camera covering a predetermined area in front of the access control device as viewed in the direction of passage. The sensor data of the sensor and/or camera are forwarded to the control device, in which the operating mode is set on the basis of these sensor data.

According to an optional embodiment, in common operation, the blocking elements can be actuated synchronously or with a time delay when receiving the third signal.

The access control device may include a plurality of the first blocking elements and the second blocking elements, each pair of which defining a common access. Further, the access control device may include a plurality of the interface devices each of which is associated with a pair of the first blocking element and the second blocking element. The control device may control the plurality of the first blocking elements and the second blocking elements based on the opening signals received from the plurality of the interface devices.

Figure 2:
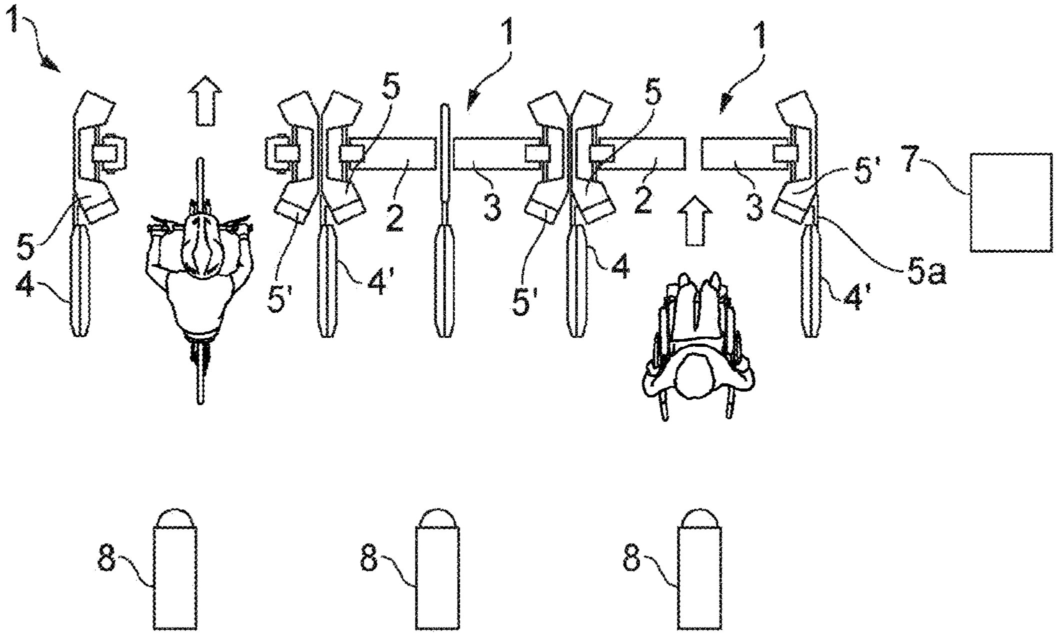
Figure 3:
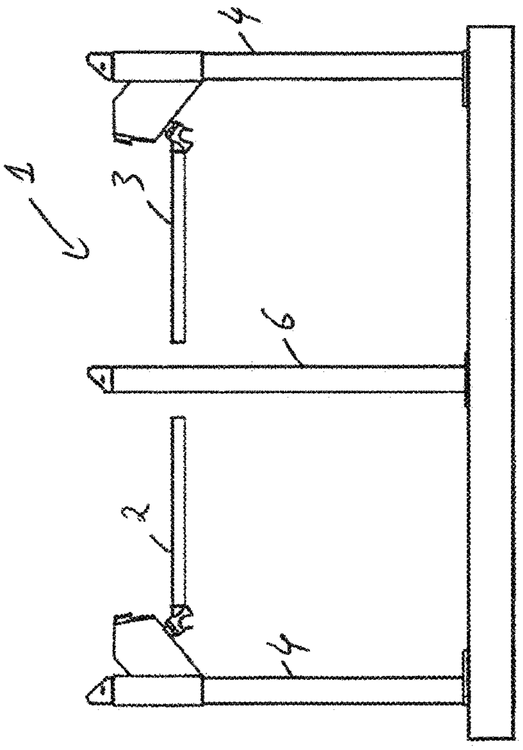

The invention is explained in more detail below by way of example with reference to the accompanying figures. Showing:

FIG. 1: A schematic representation of several access control devices according to the invention, the locking members of which are configured for autonomous operation;

FIG. 2: A schematic representation of a plurality of access control devices according to the invention, the locking members of which are configured to operate together;

FIG. 3: A schematic side view of an access control device according to the invention; and FIGS. 4, 5: Schematic representations of an access control device according to the invention, illustrating the setting of the operating mode on the basis of a second signal generated on the basis of the detection of the required passage width.

FIGS. 1, 2 and 3 show access control devices 1, which comprise a first blocking element 2 and a second blocking element 3, each arranged on a first supporting device 4 and a second supporting device 4', respectively. In the examples shown in FIGS. 1 and 2, adjacently arranged access control devices 1 have a common supporting device 4. A common access is defined between the first supporting device 4 and the second supporting device 4' of a single access control device 1, wherein the blocking elements 2, 3 of each access control device 1 are each arranged on an opposite side of the common access such that, when both blocking elements 2, 3 are closed/locked, the common access is blocked. When both blocking elements 2, 3 are opened/unlocked, the common access allows access. The blocking elements 2, 3 are shown symbolically in FIGS. 1 and 2, wherein the access control device 1 according to FIG. 3 has blocking elements 2, 3 designed as single-arm turnstiles. The access control devices 1 further comprise controllable drive means (such as one or more actuators, electrical motors, or the like) for the respective blocking elements 2, 3 which are not shown in the figures since they can be arranged in housings of the first supporting device 4 and the second supporting device 4', respectively.

In these embodiments, the blocking elements 2, 3 of the access control device 1 can be actuated jointly on the basis of the evaluation of access authorizations which can be read out by means of a first reading device 5 and a second reading device 5' for reading out access authorizations. The first reading devices 5 and the second reading device 5' can be a part of an interface device 5*a*.

In autonomous operation, a part of the common access is blocked by actuation and/or locking of the first blocking element 2 and/or the blocking element 3 as a partial access, wherein at least one of the first reading device 5 and the second reading device 5' can be uniquely assigned to each blocking element 2, 3. The blocking elements 2, 3 and thus the partial accesses are dimensioned in such a way that—depending on the design of the access control device 1—access by persons or vehicles is possible via the partial accesses.

In the example shown in FIG. 1, each access control device 1 comprises two respective reading devices 5, 5', the access control devices 1 shown being configured for autonomous operation, so that the first reading device 5 is uniquely associated with the first blocking element 2, and the second reading device 5' is uniquely associated with the second blocking element 3. This configuration is for example suitable in the case of access control devices 1 for people, for example for winter operation in ski resorts, where the required access width corresponds to the width of a partial access. In the left part of FIG. 1, the access control device 1 is shown in a state in which, in autonomous operation, the left partial access is open by actuation of the first blocking element 2.

In joint operation, at least one reading device 5, 5' can be assigned jointly to both blocking elements 2, 3 of the access control device 1, so that, in the case of an access authorization validly read out by the at least one reading device 5, 5', both blocking elements 2, 3 are actuated jointly.

In the example shown in FIG. 2, either both reading devices 5, 5' or one of the reading devices 5, 5 can be assigned to both blocking elements 2, 3, so that both blocking elements 2, 3 are opened/unlocked when a valid access authorization is present. If only one of the reading devices 5, 5 is assigned to both blocking elements 2, 3, the other reading device is inactive. In the example shown in FIG. 2, the access control device 1 shown is configured for joint operation, so that when a valid access authorization is present, both blocking elements 2, 3 are opened. This mode of operation is suitable, for example, for summer operation at ski resorts to provide access for mountain bikers or wheelchair users.

The access control device 1 includes a control device 7 which can be positioned remote from the blocking elements 2, 3. The control device 7 can be a computer that is electronically connected to the blocking elements 2, 3 and the interface device 5*a* (comprising the first and second reading devices 5, 5'). The control device 7 is configured to generate a first signal triggering the opening/unlocking of the first blocking element 2, a second signal triggering the opening/unlocking of the second blocking element 3, and a third signal triggering the opening/unlocking of the first blocking element 2 and the second blocking element 3 (see FIG. 3). The control device 7 generates the first signal and the second signal upon receiving a first opening signal from the first reading device 5 and the second reading device 5', respectively. The control device 7 generates the third signal upon receiving a third opening signal from the first reading device 5 and/or the second reading device 5'.

The control device 7 may include a memory storing a relationship between the first opening signal and/or the second opening signal and the generation of the third signal. Thus, the control device 7 may generate the third signal when receiving the first opening signal and/or the second opening signal if there is a corresponding link stored in the memory. This may be done in the situation described in conjunction with FIG. 2.

The access control device 1 may further include a sensor device 8 configured to generate sensor data which allow the determination of a width of the person and/or vehicle. In the embodiments shown in the figures, the sensor device includes a camera imaging the common access. The sensor device 8 is electronically connected to the control device 7 which is configured to determine the width of the person and/or vehicle. If the control device 7 determines that the width of the person and/or vehicle is greater than the width of the first blocking element 2 or the second blocking element 3, the control device 7 generates the third signal (triggering the opening/unlocking of both blocking elements 2, 3) even if the first opening signal and/or the second opening signal are received and there is no information stored that the first opening signal and/or the second opening signal are linked with the generation of the third signal. Thus, the control device 7 can automatically adapt the width of the granted access to the width of the person and/or vehicle.

In the examples shown in FIGS. 1, 2 and 3, the access control devices 1 comprises a centre device 6 which, in autonomous operation, can be arranged manually or automatically between the ends of the blocking elements 2, 3 in the closed state and is removed manually or automatically in common operation. The centre device 6 can be moved automatically and can be actuated via an actuator. The centre device 6 can include a hydraulic or electromechanical extendable bollard, wherein, according to further embodiments, at least one reading device can be attached to the centre device 6.

If an automatically arrangeable centre device 6 is provided, this is lowered in common operation before the actuation of the blocking elements 2, 3. In the examples according to FIGS. 1 and 3, the centre devices 6 are arranged between the ends of the blocking elements 2, 3 of the access control devices 1, whereas in the example according to FIG. 2, no centre devices 6 are provided or these are lowered.

According to a further embodiment, the access control device 1 can be operated in such a way that the selection of the operating modes is performed jointly or autonomously not manually. In this case, information as to whether common access or partial access is required can be stored in the respective access authorization and can be read out. The interface device 5*a* thus reads the first opening signal or the second opening signal for providing partial access or the third opening signal for providing common access. Alternatively or additionally, the required access width can be detected by means of the evaluation of the sensor data from at least one sensor and/or the camera which, viewed in the direction of passage, cover a predetermined area in front of the access control device 1.

Figure 4:
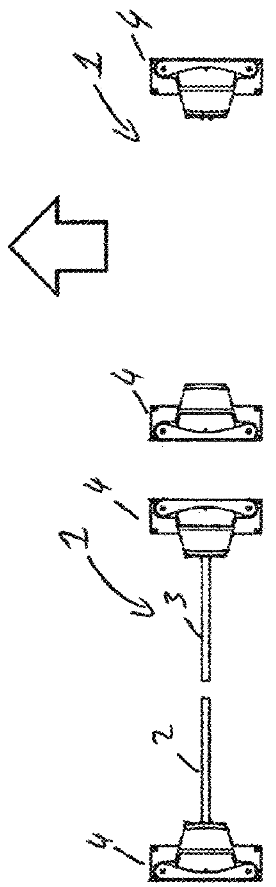

This is illustrated with reference to FIGS. 4 and 5, which show the access control device 1 for persons, the blocking elements 2, 3 of which are designed as single-arm turnstiles; the reading devices 5, 5' are not shown in FIGS. 3 to 5. In the left-hand parts of FIGS. 4 and 5, the access control device 1 is shown in a state in which both blocking elements 2, 3 block access (are closed). When a person who needs common access approaches, which may be the case for example with a wheelchair user, a parent with a pram or a person with a bicycle, this is detected either by reading the access authorization via one of the reading devices 5, 5' or by means of the sensor data from the at least one sensor and/or the camera, so that the access control device 1 is operated in the "common" operating mode and both blocking elements 2, 3 are opened, as shown with reference to the right-hand part of FIG. 4.

Figure 5:
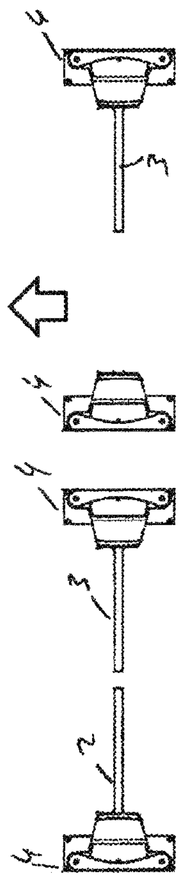

If common access is not required by a person, this is also detected by reading the access authorization or by means of the sensor data from the at least one sensor and/or the camera, so that the access control device 1 is operated in the "autonomous" operating mode and a blocking element 2 is opened in order to grant access, as illustrated by the right-hand part of FIG. 5. In FIGS. 4 and 5, the blocking members 2, 3 are not shown in the open state.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An access control device for a person and/or a vehicle, the access control device comprising:

a first blocking element and a second blocking element, the first blocking element and the second blocking element being positioned adjacent to each other for defining a common access;

an interface device configured to generate an opening signal in response to receiving an access request, wherein the interface device includes a first reading device coupled to the first blocking element and a second reading device coupled to the second blocking element; and a control device configured to control the first blocking element and the second blocking element in response to the opening signal from the interface device, the control device being configured to generate a first signal for enabling access controlled by the first blocking element, a second signal for enabling access controlled by the second blocking element, and a third signal for simultaneously enabling access controlled by the first blocking element and the second blocking element, wherein the control device is configured to generate the first signal in response to receiving a first opening signal from the first reading device, generate the second signal in response to receiving a second opening signal from the second reading device, and generate the third signal in response to receiving a third opening signal from the first reading device.

2. The access control device of claim 1, further comprising a center device movable between a retracted position and a protruding position, wherein, in the protruding position, the center device is arranged between the first blocking element and the second blocking element, and wherein, in the retracted position, the center device is positioned such that the center device does not interfere with the common access.

3. The access control device of claim 2, wherein;

the center device is received in a cavity below the common access in the retracted position; and/or the interface device includes a third reading device that is arranged on the center device.

4. The access control device of claim 1, wherein the first blocking element and/or the second blocking element include a flap and/or a turnstile, including two or three arms.

5. The access control device of claim 4, wherein the turnstile includes two or three arms.

6. The access control device of claim 1, wherein the interface device includes means for contactless recognition of a ticket and/or means for biometric recognition.

7. An access control device for a person and/or a vehicle, the access control device comprising:

a first blocking element and a second blocking element, the first blocking element and the second blocking element being positioned adjacent to each other for defining a common access;

an interface device configured to generate an opening signal in response to receiving an access request; and a control device configured to control the first blocking element and the second blocking element in response to the opening signal from the interface device, the control device being configured to generate a first signal for enabling access controlled by the first blocking element, a second signal for enabling access controlled by the second blocking element, and a third signal for simultaneously enabling access controlled by the first blocking element and the second blocking element, wherein the control device includes a memory and is configured to generate the third signal in response to receiving a first opening signal if information is stored in the memory which links receipt of the first opening signal to generation of the third signal; and wherein the control device is configured to generate the third signal in response to receiving a second opening signal if information is stored in the memory which links receipt of the second opening signal to generation of the third signal.

8. The access control device of claim 7, further comprising a center device movable between a retracted position and a protruding position, wherein, in the protruding position, the center device is arranged between the first blocking element and the second blocking element, and wherein, in the retracted position, the center device is positioned such that the center device does not interfere with the common access.

9. The access control device of claim 8, wherein;

the center device is received in a cavity below the common access in the retracted position; and/or the interface device includes a third reading device that is arranged on the center device.

10. The access control device of claim 7, wherein the first blocking element and/or the second blocking element include a flap and/or a turnstile, including two or three arms.

11. A method for controlling access for a person and/or a vehicle, the method comprising:

generating, by an interface device, an opening signal in response to receiving an access request; and controlling a first blocking element and a second blocking element in response to the opening signal from the interface device, the first blocking element and the second blocking element being positioned adjacent to each other for defining a common access, wherein controlling the first blocking element and the second blocking element comprises:

generating a first signal for enabling access controlled by the first blocking element in response to receiving a first opening signal from a first reading device coupled to the first blocking element;

generating a second signal for enabling access controlled by the second blocking element in response to receiving a second opening signal from a second reading device coupled to the second blocking element; and generating a third signal for simultaneously enabling access controlled by the first blocking element and the second blocking element in response to receiving a third opening signal from the first reading device.

12. The method of claim 11, further comprising moving a center device between a retracted position and a protruding position, wherein, in the protruding position, the center device is arranged between the first blocking element and the second blocking element, and wherein, in the retracted position, the center device is positioned such that the center device does not interfere with the common access.

13. The method of claim 12, wherein:

the center device is received in a space below the common access; and/or the interface device includes a third reading device that is arranged on the center device.

14. The method of claim 11, wherein generating the opening signal includes contactless recognition of a ticket and/or biometric recognition.

15. The method of claim 11, wherein the first blocking element and/or the second blocking element include a flap and/or a turnstile.

16. The method of claim 15, wherein the turnstile includes two or three arms.

17. A method for controlling access for a person and/or a vehicle, the method comprising:

generating, by an interface device, an opening signal in response to receiving an access request; and controlling a first blocking element and a second blocking element in response to the opening signal from the interface device, the first blocking element and the second blocking element being positioned adjacent to each other for defining a common access, wherein controlling the first blocking element and the second blocking element includes:

generating a first signal for enabling access controlled by the first blocking element;

generating a second signal for enabling access controlled by the second blocking element;

generating a third signal for simultaneously enabling access controlled by the first blocking element and the second blocking element in response to receiving a first opening signal if information is stored in a memory which links receipt of the first opening signal to generation of the third signal; and generating the third signal in response to receiving a second opening signal if information is stored in a memory which links receipt of the second opening signal to generation of the third signal.

18. The method of claim 17, further comprising moving a center device between a retracted position and a protruding position, wherein, in the protruding position, the center device is arranged between the first blocking element and the second blocking element, and wherein, in the retracted position, the center device is positioned such that the center device does not interfere with the common access.

19. The method of claim 18, wherein:

the center device is received in a space below the common access; and/or the interface device includes a third reading device that is arranged on the center device.

20. The method of claim 17, wherein generating the opening signal includes contactless recognition of a ticket and/or biometric recognition.

* * * * *